United States Patent [19]
Van Wingerden

[11] 4,173,101
[45] Nov. 6, 1979

[54] GREENHOUSE GUTTER ASSEMBLY

[76] Inventor: Aart Van Wingerden, R.R. 2, Fletcher, N.C. 28732

[21] Appl. No.: 849,443

[22] Filed: Nov. 7, 1977

[51] Int. Cl.² .............................................. E04D 13/06
[52] U.S. Cl. ....................................................... 52/13
[58] Field of Search .......... 135/DIG. 1; 52/63, 11–16

[56] References Cited

U.S. PATENT DOCUMENTS

| 712,135 | 10/1902 | Ickes | 52/14 |
|---|---|---|---|
| 1,046,910 | 12/1912 | Wagner | 52/15 |
| 3,911,632 | 10/1975 | Bryfogle | 52/13 |

FOREIGN PATENT DOCUMENTS 1071927  12/1959  Fed. Rep. of Germany .............. 52/13

OTHER PUBLICATIONS

Progressive Architecture, Jun. 1954, pp. 114 and 115.

*Primary Examiner*—John E. Murtagh
*Attorney, Agent, or Firm*—Bailey, Dority & Flint

[57] ABSTRACT

A greenhouse gutter assembly is illustrated wherein an extruded channel member has integral upper and lower sides projecting from the ends of a horizontal drainage member and an insulating bottom is spaced below the drainage bottom creating an air space extending below and across the drainage bottom. Means are also provided creating an insulating air space across the upper sides which facilitates attachment of the bow members of the roof as well as providing insulation for the greenhouse.

5 Claims, 2 Drawing Figures

GREENHOUSE GUTTER ASSEMBLY

BACKGROUND OF THE INVENTION

Gutter assemblies of various types have been constructed heretofore for greenhouses such as illustrated in U.S. Pat. Nos. 3,911,632 and 1,930,750. The latter patent is for a more conventional structure, whereas the first mentioned shows an extrusion for a structure of the general type contemplated for use with the present invention. The first mentioned patent does not, however, illustrate insulating means which add to the structural capabilities of the gutter assembly. Applicant's gutter assembly affords insulation at the sides and the bottom of the gutter, as well as increased structural support capabilities.

Accordingly, it is an important object of this invention to provide an improved extruded greenhouse gutter assembly capable of affording insulation through the provision of air spaces about the sides and the bottom, while at the same time providing a simple structure having improved structural characteristics.

BRIEF DESCRIPTION OF THE INVENTION

It has been found that an improved extruded gutter assembly may be provided by integrally extruding a section having a drainage member with sides projecting above and below, the sides projecting below having means for receiving a spaced insulating member therebelow while the upwardly projecting sides secure roof covering members while affording an air space about the sides, thus effectively insulating the greenhouse.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

A greenhouse gutter assembly includes an extruded channel member A having a horizontal drainage bottom and an upper side projecting upwardly adjacent each end of the gutter bottom. A lower side B projects downwardly adjacent each end of the gutter bottom. A horizontal insulating bottom C is spaced below the drainage bottom extending between the lower sides, and means D positions the insulating bottom forming together with the lower sides an insulating air spaces below and extending across the drainage bottom.

Figure 1:
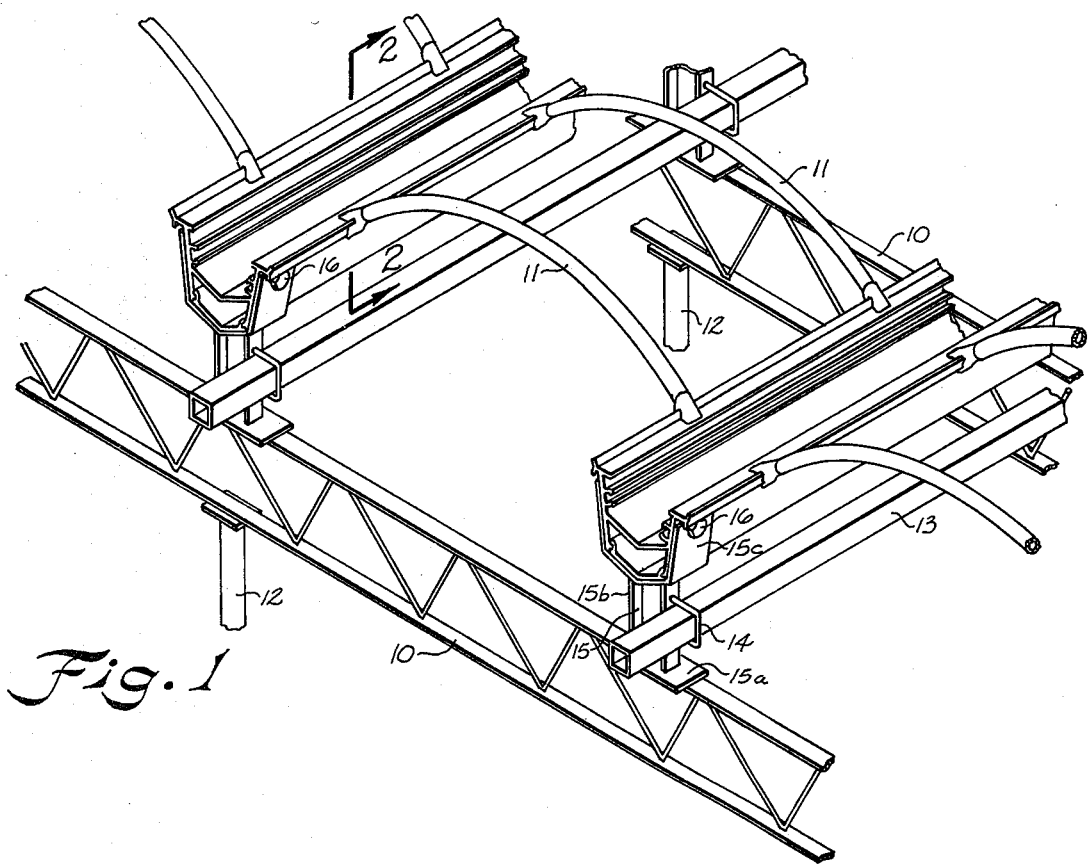
FIG. 1 is a perspective view illustrating a greenhouse constructed with gutters manufactured in accordance with the present invention with parts omitted and parts broken away.

The greenhouse is illustrated in FIG. 1 as including transverse truss members 10 spaced along the greenhouse while the gutter assemblies serve as longitudinal support members for supporting the longitudinally spaced bow members 11. The trusses 10 are suitably supported by spaced vertical posts 12. The trusses are provided with longitudinal support members 13 which are carried by U-shaped fasteners 14 which extend outwardly from bracket holders 15 which support the longitudinal gutters. The bracket holders include a base 15a which is suitably secured to an upper cord of the trusses 10. A support stand 15b which extends upwardly from the base, together with a substantially U-shaped bracket member 15c, is carried on top of the stand. The U-shaped bracket holder has bolts or other suitable fastening means 16 for securing each leg of the U-shaped bracket holder adjacent an opposite side of the U-shaped bracket holder.

Figure 2:
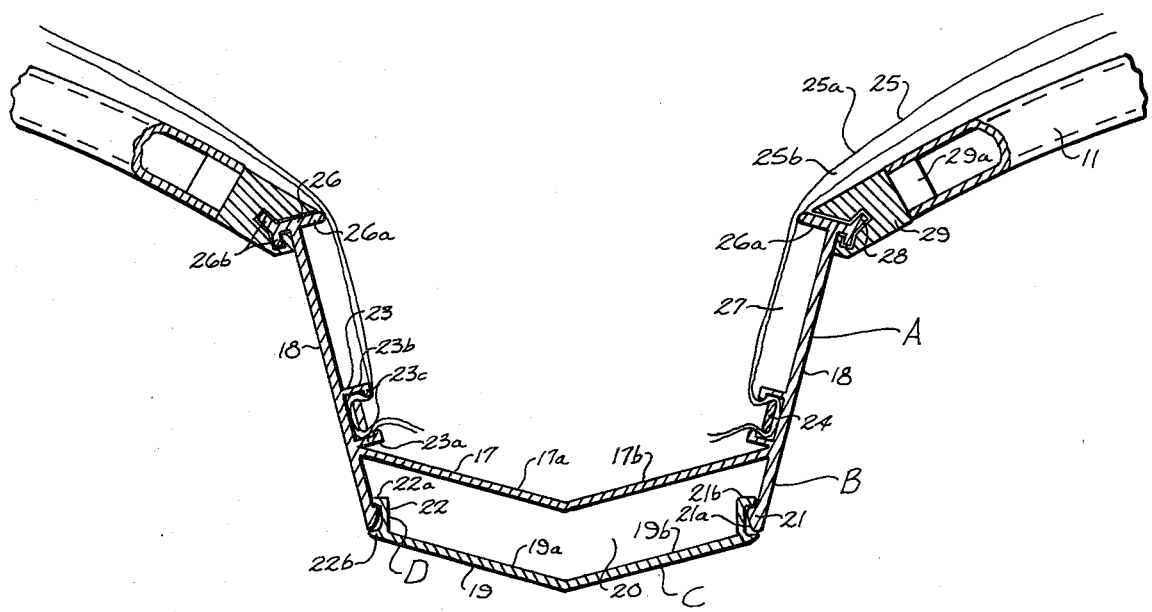
FIG. 2 is a transverse sectional elevation taken on the line 2—2 in FIG. 1.

Referring more particularly to FIG. 2, it will be noted that the extruded channel member A comprises a horizontal drainage bottom 17 which is preferably defined by downwardly converging members 17a and 17b to facilitate drainage and to enhance the structural quality of the channel. Upper side members 18 extend upwardly therefrom and are integrally connected to the drainage bottom 17 adjacent the ends thereof. Lower side members B extend integrally from the juncture of the upper side 18 and drainage bottom 17 downwardly for insertably securing the horizontal insulating bottom C. The insulating bottom C is somewhat V-shaped as illustrated at 19 and is complementary to the drainage bottom 17 being formed by inwardly and downwardly converging members 19a 19b.

Means D are provided for positioning the insulating bottom C so as to form an air space 20 below and extending across the drainage bottom 17. The means B are illustrated as including an inwardly extending protuberance 21 carried adjacent the lower free ends of the lower sides B. The inwardly extending protuberance 21 has an upwardly extending camming surface 21a as well as an upper surface 21b. A channel-shaped member 22 is integrally formed adjacent each end of the insulating bottom C and includes a pair of spaced outwardly extending legs 22a and 22b for confining the protuberance 21 therebetween. A channel support 23 is extruded integrally with the channel member and includes a lower leg 23a adjacent the juncture of the drainage bottom 17 with the lower legs B. The channel also includes a spaced leg 23b opposite the leg 23a. Each of the legs of the channel-shaped member 23 have inward projections 23c adjacent each end thereof for accommodating a fastener strap 24 which confines a free end of imperforate plastic sheet material 25 therein. The plastic roof material preferably includes double layers 25a and 25b of plastic material.

A flange extends across the upper ends of the channel member A integrally therewith and is designated at 26. The flange includes an inwardly projecting leg 26a which serves to support the plastic roof material 25 forming an air space 27. An outer projection includes a pair of diverging legs 26b which are accommodated within a slot 28 carried within a bracket 29 which has a portion 29a for extending inwardly of the tubular bow members 11 as a support therefor.

The channel member and associated parts of the assembly are preferably extruded of a suitable polymeric plastic which imparts limited flexibility to the upper and lower sides making it convenient to snap on the insulating bottom and to attach the roof covering material.

While a preferred embodiment of the invention has been described using specific terms, such description is for illustrative purposes only, and it is to be understood that changes and variations may be made without departing from the spirit or scope of the following claims.

What is claim is:

1. A greenhouse gutter assembly comprising:

an extruded channel member having a horizontal drainage bottom and an upper side projecting upwardly adjacent each end of said gutter bottom;

a lower side projecting downwardly adjacent each end of said gutter bottom integral therewith;

a horizontal insulating bottom spaced below said drainage bottom extending between said lower sides; and means positioning said insulating bottom forming together with said lower sides an insulating air space below and extending across said drainage bottom including a cam member carried adjacent a lower end of each of said lower sides, and a bracket carried adjacent each side of said insulating bottom for encompassing said cam; whereby said air space serves to insulate the greenhouse and said lower sides enhance the structural characteristics of the gutter.

2. The structure set forth in claim 1 werein (said lower sides project integrally downwardly from said drainage bottom, and) said means positioning said insulating bottom are carried within said lower sides.

3. The structure set forth in claim 2 including a bracket carried by said extruded channel member adjacent each edge of said drainage bottom for receiving a flexible cover for said greenhouse.

4. The structure set forth in claim 3 including an inwardly projecting member carried adjacent an upper edge of said upper sides for spacing said flexible cover from said upper sides.

5. The structure set forth in claim 4 including an outwardly projecting member carried adjacent said upper edges for attaching roof supports for said greenhouse.

* * * * *